US012350930B2

(12) United States Patent
Knierim et al.

(10) Patent No.: US 12,350,930 B2
(45) Date of Patent: Jul. 8, 2025

(54) PRINT HEAD ANGLE AND STITCH ALIGNMENT DURING FULL SPEED PRINTER OPERATION

(71) Applicant: XEROX CORPORATION, Norwalk, CT (US)

(72) Inventors: David L. Knierim, Wilsonville, OR (US); Chad J. Slenes, Sherwood, OR (US)

(73) Assignee: XEROX CORPORATION, Norwalk, CT (US)

( * ) Notice: Subject to any disclaimer, the term of this patent is extended or adjusted under 35 U.S.C. 154(b) by 159 days.

(21) Appl. No.: 18/170,681

(22) Filed: Feb. 17, 2023

(65) Prior Publication Data

US 2024/0278552 A1 Aug. 22, 2024

(51) Int. Cl.
*B41J 29/393* (2006.01)
*B41J 2/045* (2006.01)
*B41J 2/21* (2006.01)

(52) U.S. Cl.
CPC ......... *B41J 2/04505* (2013.01); *B41J 2/0458* (2013.01); *B41J 2/04581* (2013.01)

(58) Field of Classification Search
CPC .............. B41J 29/393; B41J 2002/3935; B41J 2/0451; B41J 2/2139; B41J 2/16579; B41J 2/2142
See application file for complete search history.

(56) References Cited

U.S. PATENT DOCUMENTS

| | | | | |
|---|---|---|---|---|
| 2011/0074860 | A1* | 3/2011 | Saettel | B41J 2/175 347/19 |
| 2011/0242187 | A1* | 10/2011 | Mongeon | B41J 3/543 347/19 |
| 2014/0002523 | A1 | 1/2014 | Chen et al. | |
| 2014/0320868 | A1* | 10/2014 | Shaked | B41J 11/008 358/1.5 |
| 2019/0224964 | A1* | 7/2019 | Mizutani | B41J 2/2142 |

FOREIGN PATENT DOCUMENTS

| | | | |
|---|---|---|---|
| WO | 2021219989 | A1 | 11/2021 |

OTHER PUBLICATIONS

Extended European Search Report issued in European Patent Application No. 24153798.4, dated Jun. 15, 2024, 8 pages.

* cited by examiner

*Primary Examiner* — Scott A Richmond
(74) *Attorney, Agent, or Firm* — Miller Nash LLP

(57) ABSTRACT

A printer includes print heads configured to eject ink drops onto print media to form images, a controller connected to the print heads to control the print heads to eject ink drops to form the images including one or more test images, one or more actuators to cause the print media to pass the print heads, and at least one camera to capture one or more optical images of the print media after the print media passes the print heads, the controller to detect the test images in the optical images and to measure print characteristics in the test image. A method of measuring ink jet print head alignment includes capturing one or more optical images of media containing printed images, detecting optical images that contain specific printed test images, and measuring print characteristics based upon image data derived from the specific printed test images.

10 Claims, 5 Drawing Sheets

PRINT HEAD ANGLE AND STITCH ALIGNMENT DURING FULL SPEED PRINTER OPERATION

TECHNICAL FIELD

This disclosure relates generally to devices that produce ink images on media, and more particularly, to the selection of inkjets to eject ink drops in such devices during printing.

BACKGROUND

Inkjet imaging devices, also known as inkjet printers, eject liquid ink from printheads to form images on an image receiving surface. The printheads include a plurality of inkjets arranged in an array. Each inkjet has a thermal or piezoelectric actuator coupled to a printhead controller. The printhead controller generates firing signals corresponding to digital data content corresponding to images. The actuators in the printheads respond to the firing signals by expanding into an ink chamber to eject ink drops onto an image receiving surface. The ink drops form an ink image corresponding to the digital image content used to generate the firing signals. The image receiving surface usually comprises a continuous web of media material or a series of media sheets.

Inkjet printers used for producing color images typically include multiple printhead assemblies. Each printhead assembly includes one or more printheads that typically eject a single color of ink. In a typical inkjet color printer, four printhead assemblies are positioned in a process direction with each printhead assembly ejecting a different color of ink. The four ink colors most frequently used are cyan, magenta, yellow, and black. The common nomenclature for such printers is CMYK color printers. Some CMYK printers have two printhead assemblies that print each color of ink. The printhead assemblies that print the same color of ink are offset from each other by one-half of the distance between adjacent inkjets in the cross-process direction to double the number of pixels per inch density of a line of the color of ink ejected by the printheads in the two assemblies. As used in this document, the term "process direction" means the direction of movement of the image receiving surface as it passes the printheads in the printer and the term "cross-process direction" means a direction that is perpendicular to the process direction in the plane of the image receiving surface.

Image quality in color inkjet printers depends upon many factors such as ink chemistry, printhead technology, thermals in the vicinity of the ink drops, print process setpoints, airflows, and ink-to-media spreading and drying interactions.

An issue arises with multiple print head printers involving alignment of the print heads. Many methods of aligning the ink jet print heads exist. Some methods align heads relative to a from or other printer structure, for example. However, optimum print head alignment occurs relative to the velocity of the print media motion. Media motion direction may not align exactly with structural printer features such as frames, especially in roll-fed printers. Media slip and stretching may slightly alter pixel spacing. These effects on media direction and pixel spacing vary depending on media speed and type. Therefore, a better approach would involve performing print head alignment in a printer's operational environment while the printer operates at full speed.

SUMMARY

According to aspects illustrated here, there is provided a printer that includes a plurality of print heads configured to eject ink drops onto print media to form images, a controller operatively connected to the plurality of print heads, the controller configured to execute code to cause the controller to control the print heads to eject ink drops to form the images including one or more test images, one or more actuators to cause the print media to pass the plurality of print heads, and at least one camera to capture one or more optical images of the print media after the print media passes the plurality of print heads at operating speed, the controller configured to execute code to cause the controller to detect the one or more test images in the one or more optical images and analyze the one or more test image to measure print characteristics in the test image.

According to aspects illustrated here, there is provided method of measuring ink jet print head alignment including capturing one or more optical images of media containing printed images, detecting optical images that contain specific printed test images, and measuring print characteristics based upon image data derived from the specific printed test images.

DETAILED DESCRIPTION

Figure 1:
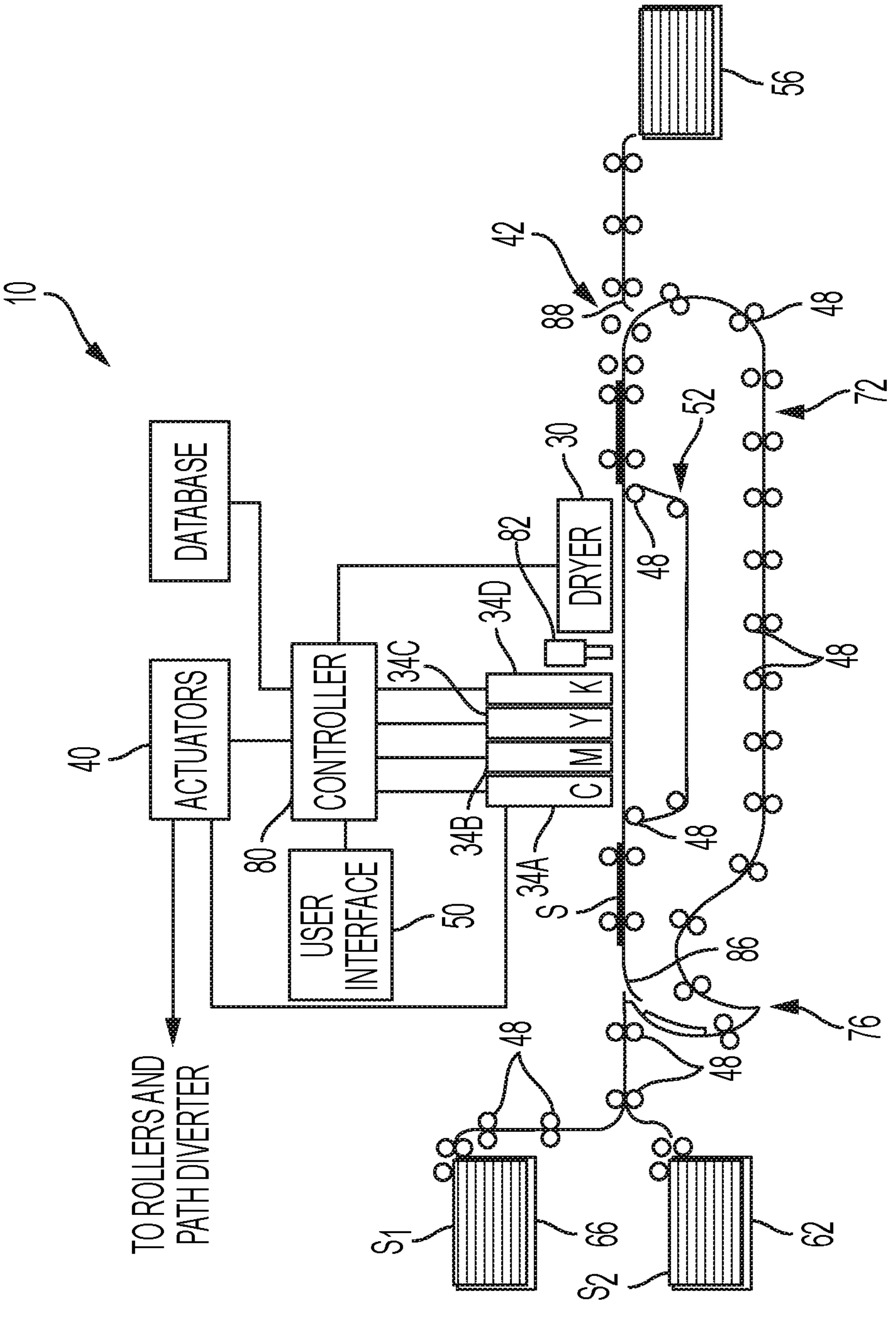
FIG. 1 shows a color inkjet printer configured to select inkjets for ejecting ink drops at the trailing edges, leading edges, and side edges that are less likely to be affected by airflow disturbances at those portions of the media sheets.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto media to form ink images. The word "media" as used here means any surface that can receive the ink drops in such a manner as to form an image.

FIG. 1 depicts a high-speed color inkjet printer 10. As illustrated, the printer 10 is a printer that directly forms an ink image on a surface of a media sheet stripped from one of the supplies 66 and 62 of media sheets $S_1$ or $S_2$ and the sheets S are moved through the printer 10 by the controller 80 operating one or more of the actuators 40 that are operatively connected to rollers or to at least one driving roller of conveyor 52 that comprises a portion of the media transport 42 that passes through the print zone PZ (shown in FIG. 2) of the printer. Other inkjet printers form an ink image on a surface of continuous media fed from a roll. The techniques within this disclosure are particularly advantageous for such roll-fed printers.

In one embodiment, each printhead module of printer 10 has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

The media transport 42 may include a belt guided by rollers 48 for moving print media, such as paper sheets, envelopes, or any other article suitable for receiving printed images, through the print zone so the printheads can eject ink drops onto the moving media to form printed images on the media. In other embodiments, media may be a continuous roll-fed web. In the case of a sheet-fed printer using a belt, the belt has holes in it and the belt moves over a vacuum plenum within the conveyor 52 so a suction force can be generated through the surface of the belt. Each print medium engages a portion of the holes on the surface of the belt and the suction force holds the print medium to the surface of the belt to prevent the print media from slipping or otherwise moving relative to the surface of the belt as the belt moves through the printer. Holding each print medium in place relative to the surface of the moving belt enables the printer to control the timing of the operation of printheads to ensure that the printheads form printed images in proper locations on each print medium and ensures that the print media do not cause jams or other mechanical issues with the printer. In large-scale printer configurations, the belt often carries multiple print media simultaneously.

Figure 2:
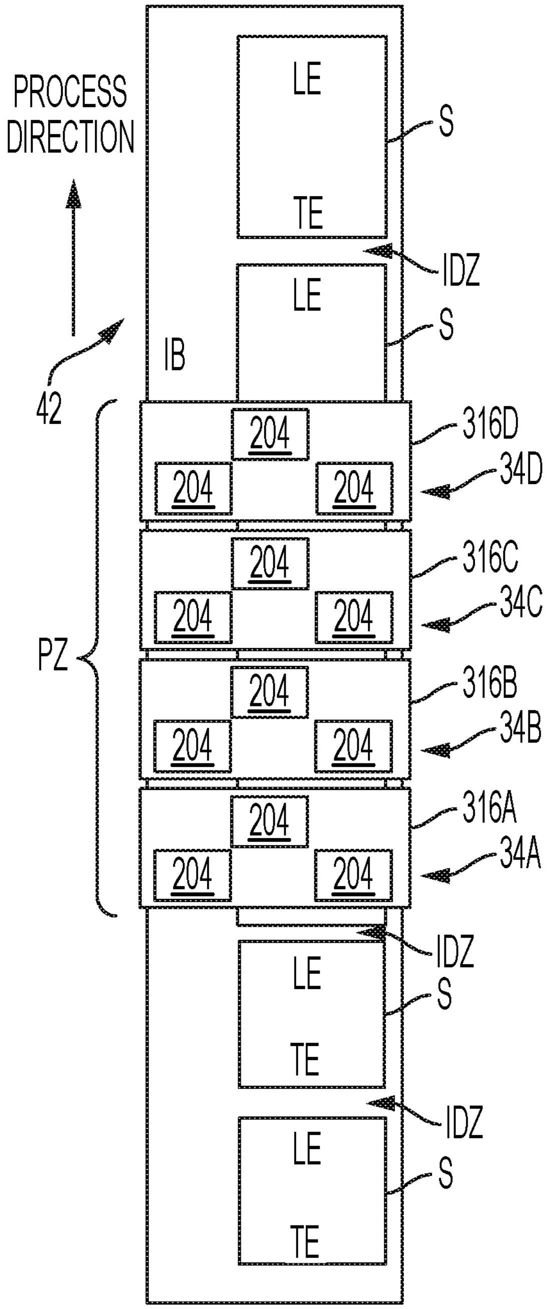
FIG. 2 shows the print zone in the printer of FIG. 1.

The print zone PZ in printer 10 of FIG. 1 is shown in FIG. 2. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 2 has three printheads 204 mounted to one of the printhead carrier plates 316A, 316B, 316C, and 316D, respectively. The legends TE, LE, and IB represent, respectively, the trailing edge, the leading edge, and the inboard edges of the media sheets passing through the print zone. The portion of the belt exposed between the TE and the LE of consecutive sheets is called an inter-document zone (IDZ) and the belt is also exposed in the IB area.

With continued reference to FIG. 1, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the media transport 42 after a substrate has been printed and move it by the rotation of rollers in an opposite direction to the direction of movement past the printheads. At position 76 in the duplex path 72, the substrate can be turned over so it can merge into the job stream being carried by the media transport 42. Controller 80 is configured to flip the sheet selectively. That is, the controller 80 can operate actuators to turn the sheet over so the reverse side of the sheet can be printed, or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 1, a substrate from media transport 42 is diverted to duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are collected.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image content data flow between image input sources, such as a scanning system or an online or a workstation connection (not shown), and the printhead modules 34A-34D. As such, the ESS or controller 80 is the main multi-tasking processor for operating and controlling all the other machine subsystems and functions, including the printing process.

Controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

The controller, in addition to operating the print heads as discussed above, may also allow for measuring of print head angle and alignment between the various print heads, in one or both of the cross-process (X) direction and the process (Y) direction. Optimum print head angle and alignment occur relative to the velocity of the print media motion. Measuring print characteristics during full speed print operations will allow the controller to adjust print operations as needed based upon operational print characteristics of the printer. The use of a camera with strobed illumination allows capturing images of the printed images for analysis during full speed operation. To aid in the analysis, the printer may print one or more test images.

Referring to FIG. 1, the camera with illumination source may reside in one of many possible positions such as 82, or any position after the print heads 34A-C have printed images on the print media. The camera captures images of the print media images. To differentiate the printed images from the images captured by the camera, the discussion will refer to the images captured by the camera as "optical" images.

Figure 3:
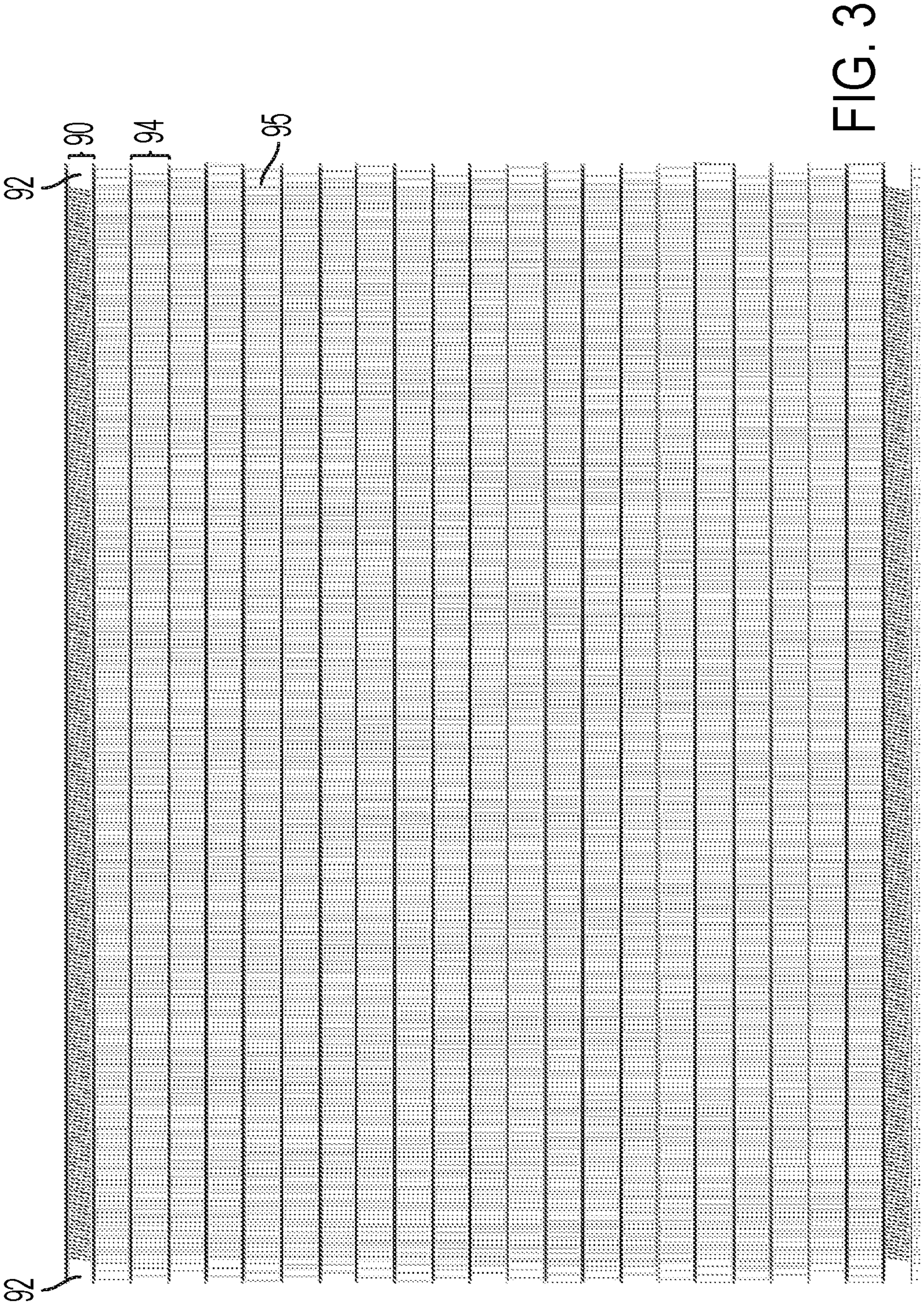
FIG. 3 shows an original print test pattern.

FIG. 3 shows an example of a test pattern. This test pattern is sent to the controller, not affected by any issues in the printer operation. The printer may print one or more test patterns based upon user input or periodically in a more automated manner. In one embodiment the test image may comprise three repeats of a test pattern. Only two repeats are necessary, ensuring that at least one camera image will be entirely within a test image. Alternately, a single test pattern is sufficient if camera image capture is synchronized to image printing such that the entire single pattern shows up in one optical image.

The test pattern shown in FIG. 3 has 22 horizontal bands. Within test patterns, horizontal corresponds to cross-process direction and vertical corresponds to process direction. The first band 90 comprises a "reference" band, with the other 21 bands in the pattern such as 94 being measurement bands. The reference band in the test image has blank spaces 92 at its left and right ends. Blank spaces 92 demark end stitch regions of the print head where jet spacing becomes sparce. Within these end regions, jets from neighboring heads within the module print image columns corresponding to gaps in jet spacing of this print head. In one embodiment, the bands consist of short vertical lines at a 21-print-pixel pitch ($^{21}/_{1200}$ inch pitch). Measurement band lines are one pixel wide, printed by a single jet, and reference band lines are 5 pixels wide and slanted with a slope of 5. The added width and slanting ensure visibility of the reference lines even if several jets are missing. While this embodiment has these specific parameters, other test patterns may employ other parameters that may depend on the specific printer or print environment.

In the embodiment shown, the 21-pixel pitch provides enough separation between lines to allow a lower-resolution camera to detect and perform accurate measurements. Further, based upon the configuration of this particular print head, using an odd number results in jets in the top half of a print head's jet array printing every other line, with intervening lines printed by jets in the bottom half of the print array. In addition, this particular print head has an array of 5544 total jets, a multiple of 21, allowing test images printed by adjacent heads in an array to line up with this print. The right edge of this print will interleave, or stitch, with the left edge of a test print made by a head to the right in a print head array. This is the same for the left edge of this print and the right edge made by a head to the left. The blank spots such as 95 at either side of measurement bands 94 show where the other test prints would appear.

Each of the 21 measurement bands is offset one pixel to the right of the band above. This ensures a 1:1 correspondence between jets and measurement band lines. Each jet prints exactly one line. Reference band lines show up in the camera image even if jets are missing. This allows determination of which measurement line matches which printed line even though scattered measurement lines are missing. This means that scattered jets that should have produced those measurement lines are not ejecting ink onto the media correctly. Such non-functioning jets are called "missing jets" even though the physical jet structure still exists.

These specific parameters demonstrate how one may adapt the approach here to other print heads, and no intention to limit the embodiments to these particular parameters is intended nor should any be implied.

Figure 4:
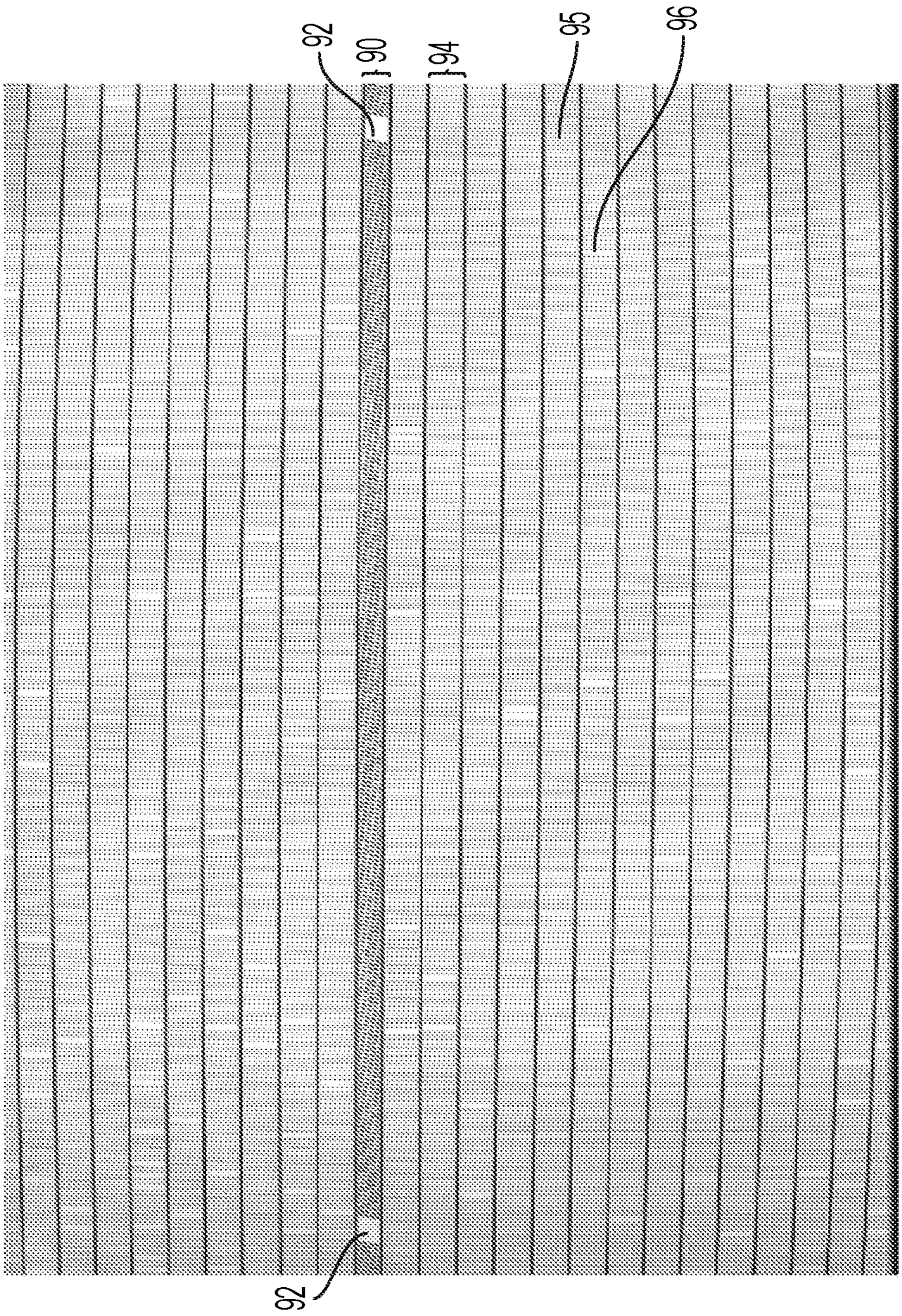
FIG. 4 shows a camera image of a printed test pattern.

FIG. 4 shows an optical image of a test pattern captured by the camera during printer operation. Heads to the left and right fill in the stitch regions that were sparse in the test print for a single head. Blank spot 95 of the test print becomes line 95 of the optical image, drawn by a jet of the head to the right. The stitch regions are demarked by blank regions such as 92 on the sides of the reference bands 90 that have no reference lines. Missing jets show up as missing measurement band lines such as 96. Reference band lines are still complete. Camera lens barrel distortion results in curved image bands and compression of line pitch towards edges. An image processing algorithm running in the controller measures and corrects distortion and camera alignment errors. This optical image happens to only include a single reference band, which is typically the case. The image processing algorithm uses the reference band to identify and align the measurement band immediately above and below. Each measurement band is then used to align the next measurement band above or below.

Figure 5:
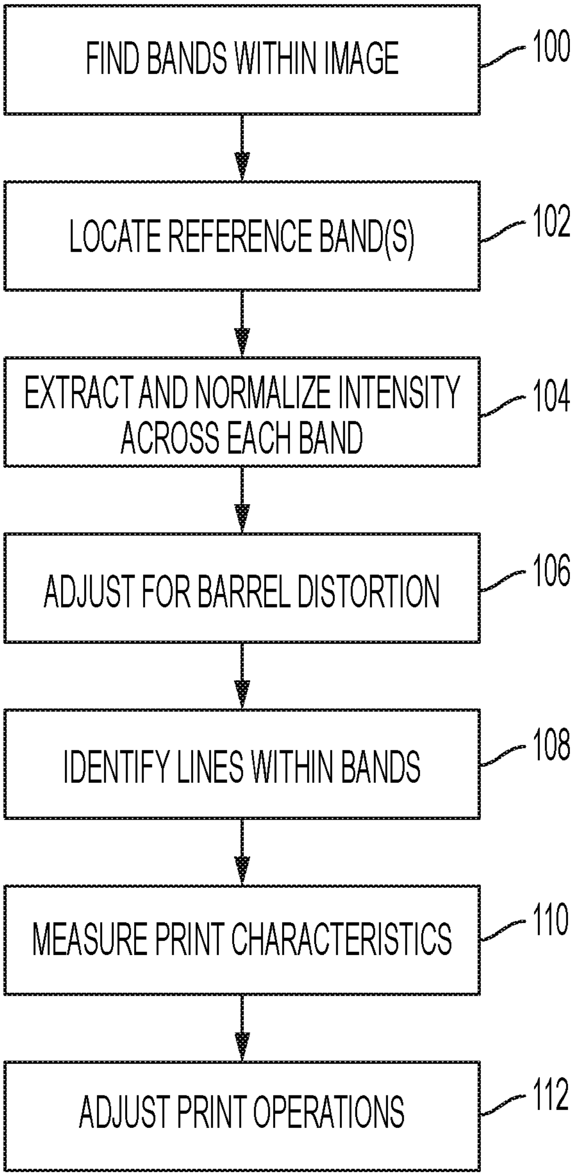
FIG. 5 shows a flowchart of an embodiment of a method of aligning print heads.

FIG. 5 shows a flowchart of a general embodiment for processing the optical image of the printed test pattern to allow measuring of print characteristics. Initially, the image processing algorithm in the controller will identify the bands within the image at 100, and then will locate the reference band(s) in the image at 102. In one embodiment, this may involve finding horizontal lines delimiting top and bottom edges of each band by looking down vertical swaths at eight horizontal positions across the image. The process can then identify reference band by its narrower height.

The process then needs to compensate for the lighting and lens intensity nonuniformity and the vertical component of lens barrel distortion at 104. In one embodiment, the process fits a curve, such as a parabola, to each band vertical position based on center six of above eight horizontal positions. The outer two of the eight above horizontal positions are not used here because they were printed by adjacent heads to the left and right. This allows determining a center portion of each band across the entire image width. Center portions are sufficiently narrow to avoid including any contribution from neighboring bands above and below even after motion blur diffuses the boundaries between bands. In one embodiment, the image pixel intensity is averaged vertically across the center portion of each band. Vertically averaged image intensity is then fit to a parabola across the width of each band. This then allows the process to normalize the intensity from across each band based on the intensity curve fit. This compensates for lighting and lens intensity nonuniformity. Within reference bands, "vertical" averaging is done at a slope of 5 rather than exactly vertical to avoid blurring the sloped lines within reference bands.

At 106, the image processing then adjusts for the horizontal component of lens barrel distortion caused by the camera. In one embodiment, the process locates a horizontal position of each line within each band based on above vertical intensity averages. The process then adjusts these horizontal positions for barrel distortion. In one example, a cubic function matches distortion well. Each line horizontal position is offset by a scale factor times the cube of its distance from the center of the band.

At 108, the process identifies reference band lines. The process can perform a simple count from the gap at the left stitch region to the gap at the right stitch region, since all reference lines are presumed visible. This allows identification of the measurement band lines, starting from bands adjacent reference band and working up and down from there. Each measurement line is assigned to the jet that printed it. The process flags missing jets for missing lines, allowing development of a list of inoperative jets.

At this point the image processing algorithm has processed the optical image of the test pattern to account for lighting and lens nonuniformity and lens distortion, and identified the relevant properties of the test pattern. The process can now measure various print characteristics at 110. These may include print head angle, print head cross-process direction position (X) for each print head relative to adjacent print heads, print head process direction position (Y) for each print head relative to adjacent print heads, and identified inoperative jets in the print heads. In one embodiment, this involves calculating a center line horizontal position relative to the outer two lines, for each set of three adjacent measurement lines. Center line horizontal position is calculated as an offset from the average horizontal position of the two outer lines. Center line horizontal position is calculated as a fraction of the distance between the outer two lines, which are 42 print pixels apart (42/1200 inches apart). This fractional distance is in print pixel units, thus independent of small remaining effects of lens barrel distortion that were not perfectly compensated for in previous steps. The process may negate (additive inverse) the measurement if the center jet was from the bottom half of head. The process then may average all valid measurements, and divide by the average vertical distance between top and bottom jet rows of the print head. This results in the print head angle.

Another measurement can measure the X-stitch, meaning the horizontal spacing relative to left and right heads. This process may be like the process for the print angle above, in one embodiment. This process finds all cases where three adjacent lines within each measurement band are printed by alternating heads. This allows calculation of the average offset between center and outer lines, resulting in the horizontal spacing for the X-position. This is also calculated in print pixel space to avoid effects of remaining lens barrel distortion.

A similar process can measure Y-stitch, meaning the vertical spacing relative to left and right heads. The process compares the left-most and right-most band edge vertical positions found above with the expected vertical positions based on the curve fit that used only the center six horizontal positions. The left and right horizontal positions are printed by heads to the left and right, while the center six were printed by this print head.

Measurement line horizontal positions in the optical image could also be used to identify jets that are printing, but at unacceptable X (horizontal) position errors. Excess position errors for single jets could be included with missing jets, allowing masking of misbehaving jets as well as missing ones. The print head operations are adjusted as needed at 112.

Variations and modifications may include using different camera sizes, such as one that has ~35-40% as high a field of view in the process direction of a camera used above to reduce the physical size of camera enclosure. To handle this, reference bands may need to be inserted more frequently, with some identifying feature to differentiate different reference bands.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the embodiments.

The invention claimed is:

1. A printer, comprising:

a plurality of print heads configured to eject ink drops onto print media to form images;

a controller operatively connected to the plurality of print heads, the controller configured to execute code to cause the controller to control the print heads to eject ink drops to form the images including one or more test images;

one or more actuators to cause the print media to pass the plurality of print heads; and at least one camera to capture one or more optical images of the print media after the print media passes the plurality of print heads at operating speed, the controller configured to execute code to cause the controller to detect the one or more test images in the one or more optical images and analyze the one or more test image to measure print characteristics in the test image, the controller further configured to execute code to perform image processing to compensate for lens barrel distortion of the camera in both a process direction and a cross-process direction.

2. The printer as claimed in claim 1, wherein the controller is further operable to control at least one of the plurality of print heads and the one or more actuators to adjust operation of the print heads in response to the measured print characteristics.

3. The printer as claimed in claim 1, wherein the code to cause the controller to analyze the one or more test images to measure the print characteristics comprises code to cause the controller to analyze the image to measure at least one of print head angle, print head cross-process direction position for each print head relative to the other print heads, print head process direction position for each print head relative to the other print heads, and identified inoperative jets in the print heads.

4. The printer as claimed in claim 1, wherein the controller is further configured to execute code to cause the controller to adjust printer operation based upon the printer characteristics measured.

5. The printer as claimed in claim 1, wherein the camera operates at a resolution of less than or equal to half the resolution of a print resolution of the plurality of print heads.

6. The printer as claimed in claim 1, wherein the camera includes a source of illumination, and the source of illumination is strobed to minimize motion blur.

7. The printer as claimed in claim 1, wherein the controller is further configured to perform image processing on the one or more optical images that contain specific printed test images to tolerate some degree of motion blur.

8. The printer as claimed in claim 1, wherein the controller is further configured to execute code to cause the controller to measure multiple print characteristics on a single test print.

9. The printer as claimed in claim 1, wherein the code that causes the controller to perform image compensation in the process direction comprises code to cause the controller to perform image compensation in camera pixel space.

10. The printer as claimed in claim 1, wherein the code that causes the controller to perform image compensation in the cross-process direction comprises code to cause the controller to perform image compensation on detected printed vertical line positions.

* * * * *